July 20, 1954
S. C. BRITTON ET AL
2,683,961
VARIABLE FREQUENCY PULSE JET ENGINE
Filed May 27, 1949
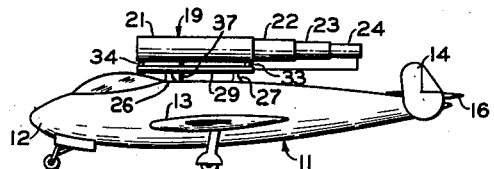
FIG. 1
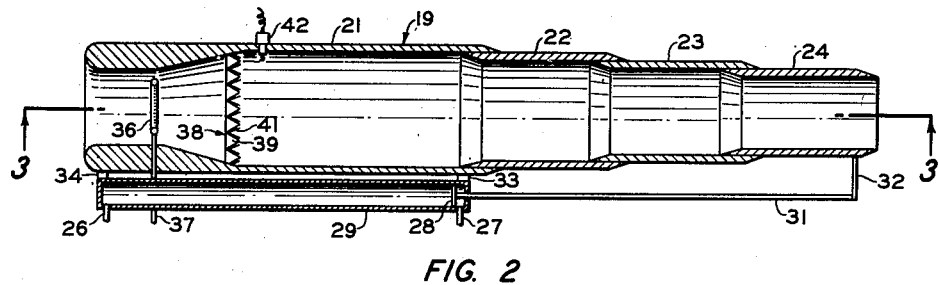
FIG. 2
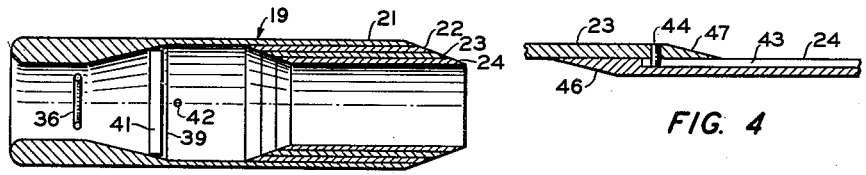
FIG. 3
FIG. 4
FIG. 5
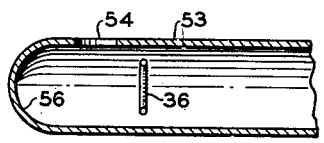
FIG. 6
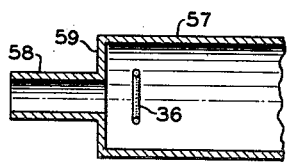
FIG. 7
INVENTORS
S. C. BRITTON
R. M. SCHIRMER
BY *Hudson & Young*
ATTORNEYS Patented July 20, 1954

2,683,961

UNITED STATES PATENT OFFICE 2,683,961

VARIABLE FREQUENCY PULSE JET ENGINE

Sylvester C. Britton and Robert M. Schirmer, Bartlesville, Okla., assignors to Phillips Petroleum Company, a corporation of Delaware Application May 27, 1949, Serial No. 95,846

2 Claims. (Cl. 60—35.6)

This invention relates to jet engines. In one specific aspect it relates to a pulse jet engine in which the length to diameter ratio can be varied. In another specific aspect it relates to pulse jet engines having a telescopic tail pipe. In another specific aspect it relates to a pulse jet engine in which the length to diameter ratio can be decreased sufficiently to enable operation as a ram jet engine. It relates to processes for operating such engines.

In the operation of pulse jet engines, if the length to diameter ratio is small starting is difficult and valve wear excessive. On the other hand, a large length to diameter ratio results in low frequency pulsations which decrease efficiency and maximum thrust output. The valves on pulse jet engines are rather short lived and it would be advantageous to operate as a ram jet engine when sufficient speed is obtained. Ram jet engines require no valves, having only a flame holder. However, ram jet engines do not ordinarily operate efficiently at low speeds.

It has been proposed in the prior art to equip an aircraft with two sets of jet engines, the first set being turbo jet engines which will get the airplane up to a high enough speed and then ram jet engines will be turned on and the turbo jet engines turned off. This results in an aircraft which is unduly complex and which means carrying the weight of extra engines.

In the present invention we have avoided these difficulties of the prior art by producing a jet engine which is capable of operation as an easily startable pulse jet engine, which can be shortened to form successively a more efficient high thrust jet engine, and finally if desired, a ram jet engine. By varying one engine through these ranges optimum operation of the pulse jet engine and all the advantages of having two sets of jet engines are obtained without the added weight and extra expense of dual engines.

One object of the present invention is to provide an improved jet engine.

Another object is to provide an improved process of operating jet engines in aircraft.

Another object is to provide a jet engine having a variable length to diameter ratio.

Another object is to provide an apparatus and a process for obtaining the optimum conditions for starting, maximum power output, maximum valve element life, and maximum fuel economy in a pulse jet engine by the use of an adjustable telescopic tail pipe.

Another object is to provide a combination pulse and/or ram jet engine.

Numerous other objects and advantages will be apparent to those skilled in the art upon reading the accompanying specification, claims and drawing.

In the drawing:

Figure 1 is an elevational view of an aircraft equipped with a jet engine embodying the present invention.

Figure 2 is an enlarged cross sectional elevational view of the jet engine shown in Figure 1 in extended telescopic relation.

Figure 3 is a cross sectional view taken along the line 3—3 of Figure 2 looking in the direction indicated, but with pipes in contracted telescopic relationship for operation as a high frequency pulse jet engine or preferably as a ram jet engine.

Figure 4 is a cross sectional view showing a detail of construction of the telescopic tubes which may be employed in a jet engine of Figures 2 and 3.

Figure 5 is a cross sectional view of an alternative form of construction which may be employed in the jet engine of Figures 2 and 3.

Figure 6 is a cross sectional elevational view of a modified form of inlet section for the jet engine which could be substituted for the forward portion of the jet engine of Figures 2 and 3, which modified form does not need any valve bank.

Figure 7 is a second modified form of inlet section for the jet engine of Figures 2 and 3 which could be substituted for the forward portion shown in those figures, and which also requires no valve bank.

In Figure 1 an aircraft generally designated as 11 is shown in flight. While aircraft 11 could be a lighter than air aircraft, it preferably is a heavier than air aircraft as shown and comprises a fuselage 12 having aerofoil surface 13 and which may be provided with a suitable empennage consisting of control surface 14 and 16. Conventional landing gear such as wheels 17 and also 18 may be provided which may be retractable into the fuselage during flight. Secured to aircraft 11 is a jet engine generally designated as 19.

Engine 19 consists of a series of cylindrically constructed, relatively telescopic pipe sections, 21, 22, 23 and 24. Section 21 is secured to the aircraft 11 by means of posts 26 and 27, which posts may act as conduits for hydraulic fluid to operate a piston 28 in cylinder 29 as will be explained in more detail later. Piston 28 moving in cylinder 29 moves rod 31 in and out of the cylinder and piston rod 31 in turn telescopes and untelescopes sections 21, 22, 23 and 24 by engaging section 24 through rod 32. Engine 19 is secured to cylinder 29 at 33 and 34.

In Figure 2, pipe 21 is shown as having a fuel distributor 36 mounted therein. Various forms of fuel distributors can be used, the perforated shower ring 36 shown being a preferred form of the same. Fuel is supplied to the distributor 36 through a pipe 37 which communicates with a fuel tank (not shown) mounted somewhere in fuselage 12 or wing 13. Pipe 21 is also provided with a valve bank 38. As such valve banks are old in the prior art of pulse jet engines, it is not believed necessary to explain the same in great detail. Valve bank 38 consists of a number of V-shaped members 39 and a number of valve leaves 41 secured at their forward edges to a member 39 and closing the opening through 39 or failing to close the same depending on the position of valve leaf 41.

Pipe 21 is provided with an ignition device 42, which may be an ordinary spark plug or spark gap as shown, for use in starting the engine.

Fuel distributor 36 may be in front of or to the rear of valve bank 38, each arrangement having certain minor advantages known to the prior art.

In order to keep pipes 21, 22, 23 and 24 in assembled telescopic relationship, they may be constructed as shown in Figure 4 in which the one member 24 is provided with a keyway or longitudinal slot 43 and the other member 23 is provided with a radially disposed pin 44 which is guided in slot 43. In order to provide a more or less streamlined surface to the interior or exterior of the jet engine pipe 24 is provided with a beveled edge 46 and pipe 23 has its edged beveled at 47.

However, other means of keeping the telescopic sleeves assembled may be employed as shown in Figure 5 where pipe 48 is telescopically engaged with pipe 49 and maintained in engagement by overlapping annular flanges 51 and 52.

It is not necessary to employ a standard valve bank 38 as shown in Figures 2 and 3, although the same is preferred. Instead an acoustical valve may be employed as shown in Figure 6 or Figure 7. By removing the inlet section including the portion containing the valve bank 38, the fuel distributor 36 and the inlet of the device and substituting the structure shown in Figure 6 or Figure 7, it is possible to operate a valve-less pulse jet engine.

The operation of the device is similar to pulse jet and/or ram jet engine operations in the prior art.

Aircraft 11 is forced through the air by a jet emerging from tail pipe 24. As the aircraft 11 moves to the left into the air, air enters the left end of pipe 21 and is supplied with fuel from distributor 36. The air fuel mixture passes through open valves 41 and is ignited by the flame from the last explosion, the hot gases passing on down through pipes 22, 23 and 24. Upon becoming ignited the gas burns rapidly causing a rise in pressure which closes valves 41. The gas expands and passes through pipes 22, 23 and 24 and emerges as a jet pulse which by reaction moves the jet engine to the left. However, as the hot gases leave through pipes 22, 23 and 24, a relative vacuum is created in pipe 21 and air coming into pipe 21 from the left pushes valves 41 open again. The operation is repeated and the frequency of the pulses or explosions has been found to be a function of the length to diameter ratio of the engine.

It is easier to start the engine with a large length to diameter ratio. Shortening the length to diameter ratio increases the efficiency and maximum thrust, but reduces the life of the valves.

The valves 41 have a natural frequency and when the length to diameter ratio is low enough so that the pulses exceed their natural frequency, valves 41 will stay open and merely act as a flame holder. At this point the device operates as a ram jet, air coming steadily in the left of tube 21, mixing with fuel from 36 and burning in pipe 21 in a continuous flame exerting a continuous thrust.

The operation of Figures 6 and 7 is similar except that in those figures the device works on the acoustical valve principle. Air entering through 54 or 58 mixes with fuel, and upon combustion is forced to the right since openings 54 or 58 restrict the flow to the left. This creates a low pressure area and more gas enters the device through openings 54 and 58.

The construction shown in Figures 2 and 3 is the preferred construction as that construction will be efficient as a ram jet engine, while it is obvious the constructions shown in Figures 6 and 7 are useful as variable frequency pulse jet engines but Figure 6 will not be effective and Figure 7 not as efficient a ram jet engine as the engine shown in Figures 2 and 3.

In operating our improved jet engine, a fuel preferably comprising a major proportion of normal paraffins is continuously supplied to the forward portion of the engine. Our preferred fuels are disclosed in copending applications 794,427, filed December 29, 1947; 352, filed January 2, 1948, and 82,517, filed March 21, 1949, but any suitable jet engine fuel may be employed and will be operable. The fuel is admixed with a stream of air passing through the valve element and enters the combustion zone as a fuel-air mixture with a fuel-air ratio in the range of .01 to .08, preferably in the range of .03 to .07. In the pulse jet range of our engine, explosion, or reaction, of the fuel-air mixture is initiated by the residual hot gases in the combustion zone and thus a series of explosions occur at a frequency in the range of about 30 to about 400 per second.

The exact ratio of frequency of pulsation to natural frequency of valves at which easiest starting is accomplished varies with individual engines. However, in general, starting ease is greatest at conditions under which high thrust and fuel economy are not obtained, the latter usually being obtained at higher pulsation frequency. Starting ease is greater with relatively high length to diameter ratio. Our invention provides for accomplishing adjustment of the length to diameter ratio to obtain this ease of starting. Once started, an engine designed according to this invention may then be adjusted by reduction of the length to diameter ratio to obtain maximum valve life, fuel economy, maximum thrust, or the best compromise of these.

The length to diameter ratio of the jet engine tail pipe can be decreased until a point is reached where the tuned frequency of the pipe is such that the valve blades are stalled open. By proper design of the valve bank, it can then be utilized as a flame holder, and operation continued as continuous flow combustion, that is, as a ram jet engine.

While we have described in the specification and shown in the drawing a number of illustrative embodiments of the invention, these embodiments were selected for illustrative purposes only and should not be regarded as limitations on the scope of the invention, which scope is defined in the appended claims.

Having described our invention, we claim:

1. The process of operating a jet aircraft having a jet engine containing a valve bank which stalls in the open position when the rate of pulsations in said engine exceeds a predetermined frequency, and which engine is then adapted for operation as a ram jet, said engine being provided with a telescopic tail pipe for varying the length to diameter ratio and thereby varying the rate of pulsations of said engine, which comprises the steps of starting said engine with the tail pipe in extended position, telescoping said tail pipe progressively with increasing velocity as the aircraft becomes airborne and the reaction of the jet of said engine increases the longitudinal velocity of said aircraft, and when said velocity exceeds a predetermined minimum velocity needed for ram jet operation of said engine, further telescoping said tail pipe and thereby increasing the rate of pulsation of said engine to the point at which said valve bank stalls in open position and said engine operates as a ram jet.

2. A pulse jet engine comprising in combination a cylindrical body composed of a plurality of concentric relatively telescopic pipes, a fuel distributor in one of said pipes, a pulse jet valve bank controlling flow of fluids through one of said pipes, a fuel igniter in one of said pipes, and a motor disposed and connected to move said pipes in telescopic relation from an extended relation to a contracted relation, there being at least three of said telescopic pipes slidably connected in series, said motor comprising a hydraulic cylinder secured to an end one of said pipes in said series, a piston slidably disposed in said cylinder, and a piston rod secured to said piston and to the other end one of said pipes in said series.

References Cited in the file of this patent

UNITED STATES PATENTS

| Number | Name | Date |
|---|---|---|
| 1,983,405 | Schmidt | Dec. 4, 1934 |
| 2,102,559 | Kadenacy | Dec. 14, 1937 |
| 2,142,601 | Bleecker | Jan. 3, 1939 |
| 2,397,357 | Kundig | Mar. 26, 1946 |
| 2,408,099 | Sherman | Sept. 24, 1946 |
| 2,496,351 | Mazzoni | Feb. 7, 1950 |
| 2,508,396 | Jordan | May 23, 1950 |

FOREIGN PATENTS

| Number | Country | Date |
|---|---|---|
| 614,696 | Great Britain | Dec. 20, 1948 |

OTHER REFERENCES

Project Squid, U. S. Navy Tech. Memo. No. Pr.–4, June 30, 1948, page 3.